(12) United States Patent
Nakasugi et al.

(10) Patent No.: US 9,120,221 B2
(45) Date of Patent: Sep. 1, 2015

(54) ROBOT CELL APPARATUS AND PRODUCTION SYSTEM

(75) Inventors: Mikio Nakasugi, Tama (JP); Mahito Negishi, Tachikawa (JP); Masaichi Sato, Tokyo (JP); Ken Meisho, Yokohama (JP); Yuji Matsuo, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 13/697,584

(22) PCT Filed: May 16, 2011

(86) PCT No.: PCT/JP2011/002690
§ 371 (c)(1),
(2), (4) Date: Nov. 13, 2012

(87) PCT Pub. No.: WO2011/145313
PCT Pub. Date: Nov. 24, 2011

(65) Prior Publication Data
US 2013/0055560 A1    Mar. 7, 2013

(30) Foreign Application Priority Data
May 19, 2010    (JP) .................................. 2010-115326

(51) Int. Cl.
*B23P 21/00*    (2006.01)
*B25J 9/00*    (2006.01)

(52) U.S. Cl.
CPC .............. *B25J 9/0084* (2013.01); *B23P 21/00* (2013.01); *B23P 21/004* (2013.01); *B25J 9/0096* (2013.01); *Y10T 29/53* (2015.01)

(58) Field of Classification Search
CPC .......... B25J 9/0096; B25J 9/0084; B25J 5/00; B25J 5/007; Y10T 29/53; Y10T 29/53313; Y10T 29/53365; Y10T 29/5337; Y10T 29/53383; Y10T 29/53387; Y10T 29/53396

USPC ...... 901/1; 409/202; 29/791, 795, 33 K, 33 P, 29/771, 783, 787
See application file for complete search history.

(56) References Cited

U.S. PATENT DOCUMENTS 4,856,701 A * 8/1989 Pockl ............................. 228/6.1
5,127,569 A * 7/1992 Sekine et al. .................. 228/6.1
(Continued)

FOREIGN PATENT DOCUMENTS

CN    101031387 A    9/2007
CN    101375220 A    2/2009
(Continued)

OTHER PUBLICATIONS

English Translation of WO-2007083011-A1 obtained from espace.net on May 15, 2014.*
(Continued)

*Primary Examiner* — Jason L Vaughan
(74) *Attorney, Agent, or Firm* — Fitzpatrick, Cella, Harper & Scinto

(57) ABSTRACT

Provided is a robot cell apparatus in which a cooperatively operable area for a pair of robot arms can be widened and which has an excellent workability. The present invention includes a table with a plane having a quadrangular shape in plan view, a workpiece being placed on the plane. Proximal ends of robot arms are respectively fixed to two corners at diagonal positions among four corners of the plane of the table. A cooperatively operable area in which the pair of robot arms are cooperatively operable is formed in a space above the plane of the table.

2 Claims, 6 Drawing Sheets

(56) References Cited

U.S. PATENT DOCUMENTS

| | | | |
|---|---|---|---|
| 5,875,726 A * | 3/1999 | Keilmann | 112/470.13 |
| 6,415,204 B1 * | 7/2002 | Hirabayashi et al. | 700/245 |
| 6,519,837 B1 * | 2/2003 | Ichikawa et al. | 29/720 |
| 6,817,829 B2 * | 11/2004 | Kameda et al. | 414/789.6 |
| 7,278,288 B2 * | 10/2007 | Reissenweber | 72/361 |
| 7,322,510 B2 * | 1/2008 | Kraus | 228/4.1 |
| 7,650,679 B2 * | 1/2010 | Bidaud et al. | 29/464 |
| 8,322,591 B2 * | 12/2012 | Diez et al. | 228/102 |
| 8,356,403 B2 * | 1/2013 | Woo et al. | 29/823 |
| 8,359,997 B2 * | 1/2013 | Vandepitte | 118/323 |
| 8,627,558 B2 * | 1/2014 | Lundberg et al. | 29/429 |
| 2007/0150093 A1 * | 6/2007 | Nagatsuka et al. | 700/235 |
| 2007/0163107 A1 * | 7/2007 | Zhang et al. | 29/759 |
| 2009/0018690 A1 | 1/2009 | Negre | |
| 2011/0258847 A1 | 10/2011 | Meisho et al. | |
| 2012/0007374 A1 | 1/2012 | Nakasugi et al. | |

FOREIGN PATENT DOCUMENTS

| | | | |
|---|---|---|---|
| FR | 2896178 A | | 7/2007 |
| JP | 60-212911 A | | 10/1985 |
| JP | S63-288681 A | | 11/1988 |
| JP | 08-216073 A | | 8/1996 |
| JP | 09-057550 A | | 3/1997 |
| JP | 2008-213130 A | | 9/2008 |
| WO | WO 2007083011 A1 * | | 7/2007 |
| WO | 2009/071567 A | | 6/2009 |

OTHER PUBLICATIONS

Notification of Transmittal of the International Search Report and the Written Opinion of the International Searching Authority, the International Search Report, and the Written Opinion of the International Searching Authority dated Aug. 3, 2011.

May 28, 2014 Chinese Office Action in Chinese Patent Application No. 201180023929.0 (with English translation).

May 16, 2014 Korean Office Action in Korean Patent Application No. 10-2012-7032570.

Jun. 3, 2014 Japanese Office Action in Japanese Patent Application No. 2010-115326.

* cited by examiner

ROBOT CELL APPARATUS AND PRODUCTION SYSTEM

TECHNICAL FIELD

The present invention relates to a robot cell apparatus that performs assembly work or the like in cooperation with a pair of robot arms, and a production system including a plurality of robot cell apparatuses.

BACKGROUND ART

Up to now, a number of assembly apparatuses that perform assembly work using robot arms have been used. Recently, there is a demand for an assembly apparatus that achieves assembly work using robot arms instead of manual assembly work. In the manual assembly work, a human cell production system is introduced in which conveyers are removed and a person directly conveys workpieces. Meanwhile, there is a demand for replacing the human cell production system with a robot cell production system. In order to replace the human cell production system with the robot cell production system, there is a need to use a plurality of robot arms so as to widen the operating ranges thereof, increase the operating distance, and be able to perform operation from any direction, without increasing the apparatus size compared to a human cell production system. In this regard, there is known an assembly apparatus which includes two robot arms and an assembly work table and which is capable of performing assembly work (see PTL 1).

CITATION LIST

Patent Literature

PTL 1: Japanese Patent Application Laid-Open No. H09-57550

Though the related art assembly apparatus includes a conveyer, the conveyer is removed when the assembly apparatus is applied to a production system of a robot cell production system. There is a demand for a production system in which a plurality of robot cell apparatuses are disposed side by side to convey workpieces using robot arms.

In the related art assembly apparatus, a pair of robot arms are arranged in parallel in a workpiece conveying direction. For this reason, if the robot cell apparatuses are structured so that the assembly apparatus is applied to the robot cell production system, the overall apparatus is increased in size. On the contrary, if the cells are downsized, the area in which assembly work is performed in cooperation with the pair of robot arms is narrowed. When the assembly work is performed in cooperation with the pair of robot arms, the direction in which work is performed on workpieces is limited. This leads to a deterioration of the workability, an increase in time for the assembly work, and a reduction in productivity.

When a plurality of related art assembly apparatuses are applied to the robot cell production system and are disposed side by side, the robot cell apparatuses need to be disposed in the vicinity of each other, and thus the robot arms are disposed side by side in parallel to the workpiece conveying direction. Therefore, the robot arms of the adjacent robot cell apparatuses are likely to interfere with each other, leading to a reduction in productivity.

SUMMARY OF INVENTION

The present invention provides a robot cell apparatus in which a cooperatively operable area for a pair of robot arms can be widened and which has an excellent workability. The present invention also provides a production system which avoids increasing the apparatus size and ensures the productivity while preventing robot arms of adjacent robot cell apparatuses from interfering with each other.

The present invention provides a robot cell apparatus which includes a pair of articulated robot arms each having a distal end at which a hand capable of grasping a workpiece is provided, and a turnable proximal end, the robot cell apparatus including a table with a plane having a quadrangular shape in plan view, a workpiece being placed on the plane, wherein the proximal ends of the robot arms are respectively fixed to two corners at diagonal positions among four corners of the plane of the table, and a cooperatively operable area in which the pair of robot arms are cooperatively operable is formed in a space above the plane of the table.

The present invention also provides a production system including a plurality of robot cell apparatuses described above, wherein the plurality of robot cell apparatuses are disposed side by side in a workpiece conveying direction so that straight lines connecting the pair of robot arms of the robot cell apparatuses are parallel to each other, and the production system is structured so that workpieces are capable of being sequentially conveyed by the robot arms of the robot cell apparatuses.

According to the robot cell apparatus of the present invention, the pair of robot arms are diagonally disposed on the plane of the table. This allows widening of the cooperatively operable area for the pair of robot arms in the space above the plane of the table, while preventing an increase in apparatus size. The pair of robot arms disposed as described above enable assembly work from any direction, resulting in an improvement of the workability.

According to the production system of the present invention, the area in which the robot arms of the adjacent robot cell apparatuses may interfere with each other can be narrowed. Accordingly, a stop time for avoiding collision of the robot arms can be reduced, thereby preventing deterioration in the productivity. Moreover, the robot arms can directly convey workpieces, thereby avoiding an increase in size of the production system.

Further features of the present invention will become apparent from the following description of exemplary embodiments with reference to the attached drawings.

DESCRIPTION OF EMBODIMENTS

Figure 1:
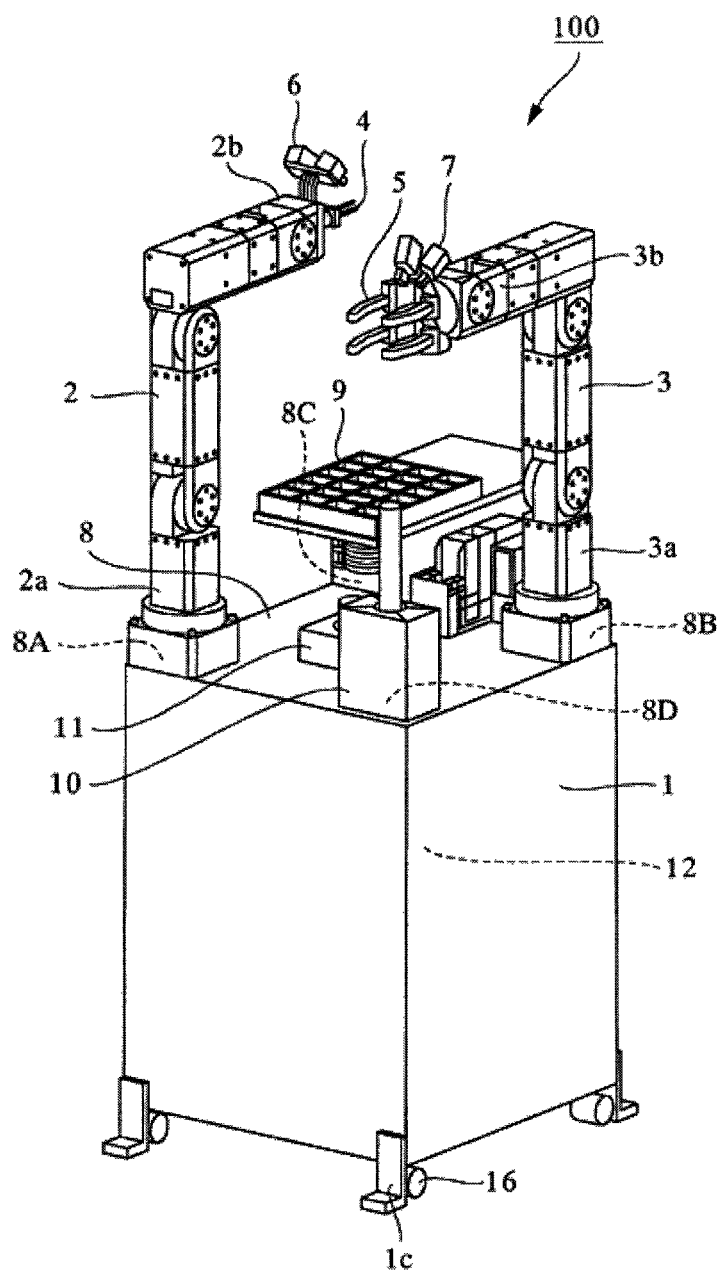
FIG. 1 is a perspective view of a robot cell apparatus according to an embodiment of the present invention.

Hereinafter, embodiments for carrying out the present invention will be described in detail with reference to the drawings. FIG. 1 is a perspective view illustrating a robot cell apparatus according to an embodiment of the present invention. As illustrated in FIG. 1, a robot cell apparatus 100 includes a pair of six-axis articulated robot arms 2 and 3. The robot arm 2 has a proximal end 2a and a distal end 2b. Similarly, the robot arm 3 has a proximal end 3a and a distal end 3b. The proximal ends 2a and 3a are structured to be turnable through 360 degrees in plan view. At the distal ends 2b and 3b, hands 4 and 5 capable of grasping a workpiece are provided. The hands 4 and 5 are general-purpose hands each including a force sensor. A small camera 6 is mounted at the distal end 2b of the robot arm 2, and a small camera 7 is mounted at the distal end 3b of the robot arm 3.

The robot cell apparatus 100 includes a table 1 with a plane 8 on which a workpiece is placed and which has a quadrilateral shape in plan view, specifically, a square shape in plan view. The plane 8 of the table 1 is a place on which a workpiece supplied from a preceding process is placed. On a bottom surface of the table 1, casters 16 are provided so as to be movable. The table 1 has a structure in which fixing brackets 1c for fixing the table 1 to the floor are mountably provided.

The proximal ends 2a and 3a of the robot arms 2 and 3 are respectively fixed to two corners 8A and 8B at diagonal positions among four corners 8A, 8B, 8C, and 8D of the plane 8 of the table 1. The proximal end 2a of the robot arm 2 is fixed to one corner 8A of the two corners 8A and 8B, and the proximal end 3a of the robot arm 3 is fixed to the other corner 8B. Rockable joint portions (wrist portions) are formed at the distal ends 2b and 3b of the robot arms 2 and 3, respectively, thereby allowing the hands 4 and 5 to rock.

A parts supplier 9 serving as a workpiece supply unit for supplying parts to be assembled is fixed to one corner 8C of the two corners 8C and 8D other than the two corners to which the robot arms 2 and 3 are fixed of the plane 8 of the table 1. A tool stand 10 on which a tool for screwing or the like is fixed to the other corner 8D.

At a central portion of the plane 8 of the table 1, a grasping jig 11 for use in assembling workpieces is provided. Above the table 1, a camera which detects a position of a workpiece and which is not illustrated is disposed. The turning operation of the proximal ends 2a and 3a of the robot arms 2 and 3, the rocking operation of the joint portions including the wrist portions, and the grasping operation and grasp releasing operation of the hands 4 and 5 are controlled by a control device 12, which is disposed in the table 1, so as to be cooperatively operable. The plane 8 of the table 1 desirably has a square shape in plan view of about 500 mm which is equal to a space of a work table for a human cell.

Figure 2:
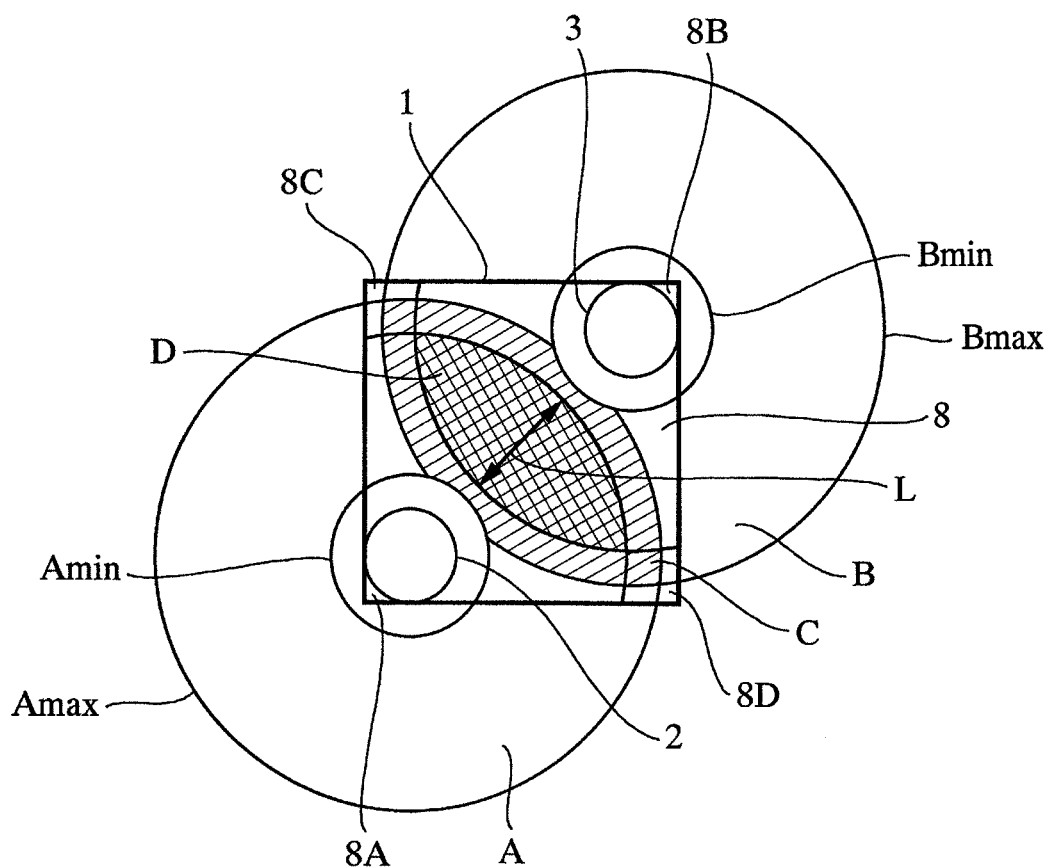
FIG. 2 is an explanatory diagram illustrating movable ranges of robot arms.

FIG. 2 is an explanatory diagram illustrating movable ranges of the robot arms 2 and 3, and is also a schematic diagram illustrating a plan view of the robot cell apparatus 100. The proximal end 2a of the robot arm 2 is turnable through 360 degrees. In plan view, a ring-shaped area A surrounded by a range $A_{max}$ in which the tip end of the hand 4 is farthest from the proximal end 2a and a range $A_{min}$ in which the tip end of the hand 4 is closest to the proximal end 2a is an operable area of the robot arm 2. Similarly, in plan view, a ring-shaped area B surrounded by a range $B_{max}$ in which the tip end of the hand 5 is farthest from the proximal end 3a and a range $B_{min}$ in which the tip end of the hand 5 is closest to the proximal end 3a is an operable area of the robot arm 3. An area C (an area indicated by oblique lines in FIG. 2) in which the area A and the area B overlap each other is an area (a shared operable area) in which work can be performed by any of the robot arms 2 and 3.

Within the area C, a cooperatively operable area (a hatched area, i.e., an area D, in FIG. 2) in which cooperative operation can be performed by the pair of robot arms 2 and 3 is formed. The term "cooperative operation" refers to an operation that is cooperatively performed by the pair of robot arms 2 and 3. For example, one robot arm 2 grasps a workpiece, and the other robot arm 3 grasps a part to be assembled to the workpiece, thereby allowing the robot arms 2 and 3 to operate so as to mate and assemble the part to the workpiece. The workpiece may be held by one robot arm 3 and screwed by the other robot arm 2.

In this embodiment, when the cooperative operation is performed by the pair of robot arms 2 and 3, it is necessary to freely move the wrist portions of the robot arms 2 and 3. Accordingly, the cooperatively operable area D is narrower than the shared operable area C to the extent that the wrist portions are movable. The cooperatively operable area D is formed in the space above the plane of the table 1, thereby enabling cooperative operation immediately above the table 1. Specifically, the cooperatively operable area D includes a central portion of the plane 8 of the table 1 in plan view, and the pair of robot arms 2 and 3 are formed to be line-symmetrical with respect to the straight line connecting the pair of robot arms 2 and 3 as the axis of symmetry. In the cooperatively operable area D, the central portion of the plane 8 of the table 1 is widest and extends to the side of the two corners 8C and 8D, in plan view. In FIG. 2, reference symbol L denotes a distance at which the cooperative operation can be performed at the central portion of the plane 8 of the table 1.

Figure 3A:
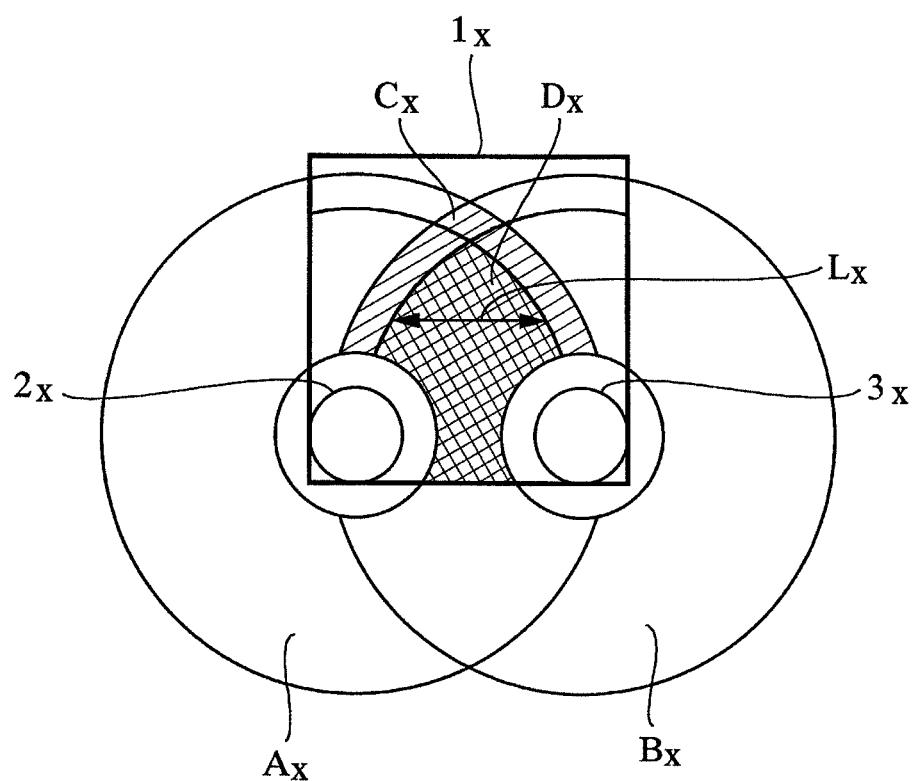
FIG. 3A is an explanatory diagram illustrating movable ranges of robot arms of a robot cell apparatus as a comparative example, and also illustrating a case where the robot arm is disposed at corners on both ends of a side on a table.
Figure 3B:
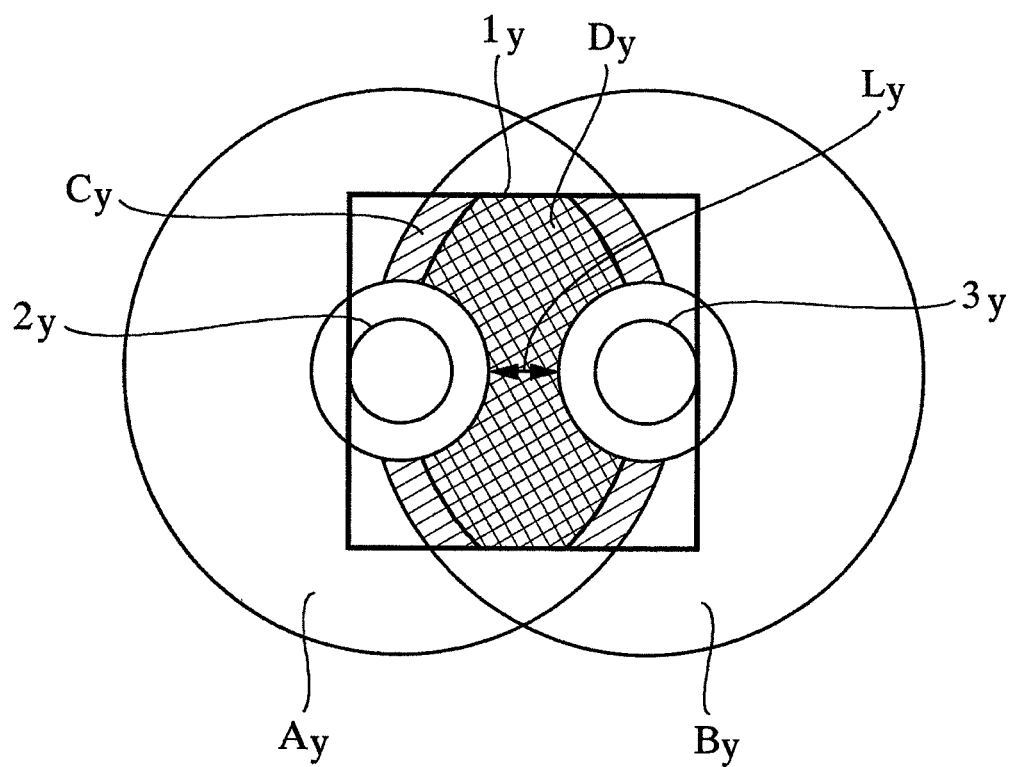
FIG. 3B is an explanatory diagram illustrating movable ranges of the robot arms of the robot cell apparatus as the comparative example, and also illustrating a case where the robot arms are disposed at each center of opposing sides.

The robot cell apparatus 100 of this embodiment is compared with a robot cell apparatus in which the layout of the pair of robot arms is different. FIGS. 3A and 3B are explanatory diagrams each illustrating movable ranges of robot arms of a robot cell apparatus as a comparative example. In FIG. 3A, the robot arms are disposed at corners on both ends of one side on the table. In FIG. 3B, the robot arms are disposed at each center of opposing sides.

In the robot cell apparatus illustrated in FIG. 3A, a cooperatively operable distance $L_x$ at a central portion of a table $1_x$ can be as long as that in this embodiment. However, a cooperatively operable area $D_x$ is not line-symmetrical with respect to the straight line connecting a pair of robot arms $2_x$ and $3_x$. The distance between the pair of robot arms $2_x$ and $3_x$ is narrow and it is desirable that the cooperative operation is performed at the central portion of the table $1_x$ where the operation space is wider than that when the cooperative operation is performed between the pair of robot arms $2_x$ and $3_x$. Accordingly, the assembly operation direction of the pair of robot arms $2_x$ and $3_x$ is limited. A shared operable area $C_x$ in which an operable area $A_x$ of the robot arm $2_x$ and an operable area $B_x$ of the robot arm $3_x$ overlap each other does not include corners on both ends of a side opposite to the side on which the robot arms $2_x$ and $3_x$ are disposed. Therefore, these two corners cannot be used as a space in which a tool, a workpiece, or the like is placed.

A cooperatively operable distance $L_y$ of the robot cell apparatus illustrated in FIG. 3B is narrower than the cooperatively operable distance L of this embodiment. A cooperatively operable area $D_y$ is narrowed at a central portion of a table $1_y$, which makes it difficult to perform a cooperative operation by a pair of robot arms $2_y$ and $3_y$ at the central portion of the table $1_y$. Therefore, since it is necessary to operate at a position away from the central portion of the table in order to cooperatively operate, the assembly operation direction of the robot arms $2_y$ and $3_y$ is changed to operate. Accordingly, an operating time may become long because of changing a posture for the cooperative operation depending on the assembly operation. A shared operable area $C_y$ in which an operable area $A_y$ of the robot arm $2_y$ and an operable area $B_y$ of the robot arm $3_y$ overlap each other hardly covers the four corners of the table $1_y$. Thus, only the central portions of two sides perpendicular to the sides on which the robot arms $2_y$ and $3_y$ are disposed, respectively, can be used, which makes it difficult to convey workpieces and supply parts.

On the contrary, in this embodiment, the robot arms 2 and 3 are disposed as illustrated in FIG. 2, so that the four sides of the table 1 can be effectively used. The shared operable area C and the cooperatively operable area D are widened and the cooperatively operable distance L can be increased. Since the shared operable area C includes the corners 8C and 8D, one corner 8C can be set as a workpiece supply possible area in which the parts supplier 9 is disposed, as illustrated in FIG. 1. The other corner 8D can be set as a maintenance possible area in which the tool stand 10 is disposed. Both the robot arms 2 and 3 can access the parts supplier 9 and the tool stand 10. The space between the pair of robot arms 2 and 3, i.e., the center of the straight line connecting the pair of robot arms 2 and 3 in plan view, is suitable for the cooperative operation. The center of the straight line corresponds to the center of the cooperatively operable area D and to the central portion of the table 1. Accordingly, the assembly work can be performed from any direction, thereby achieving a skillful operation.

The actual assembly work in the robot cell apparatus 100 structured as described above will be described. When a workpiece is conveyed from the preceding process and placed on the plane 8 of the table 1, the position of the workpiece and the position of a component, which is another workpiece to be assembled, are detected by a camera which is disposed above the table 1 and which is not illustrated.

The control device 12 controls each joint portion and the hand 4 of the robot arm 2 so that the hand 4 of the robot arm 2 grasps the workpiece based on data obtained when the positions are detected. Meanwhile, the control device 12 controls each joint portion and the hand 5 of the robot arm 3 so that the hand 5 of the robot arm 3 grasps the part placed on the parts supplier 9. The robot arm 2 and the hand 4 and the robot arm 3 and the hand 5 are cooperatively controlled. At this time, the cooperative control is made while using the force sensors and the small cameras 6 and 7 which are provided to the hands 4 and 5, respectively, thereby achieving skillful and complicated work such as a mating assembly.

Next, the workpiece is set by the robot arm 2 and the hand 4 to the grasping jig 11 which is provided at the central portion of the table 1. Assembly work, such as screwing, is performed by the robot arm 3 and the hand 5 by using a tool such as an electric screwdriver which is provided on the tool stand 10 and which is not illustrated. After the assembly work is completed, the hand 5 grasps the workpiece, and the proximal end 3a of the robot arm 3 turns, thereby conveying the workpiece to the plane of the table of the robot cell apparatus in a subsequent process.

In the above description, the work necessary for the cooperative control has been described. However, when the cooperative control is not necessary, the assembly work may be performed after the workpiece is set to the grasping jig. The force sensors and small cameras may also be used in the assembly work which is not a cooperative operation. Screwing has been described by way of example as the assembly work using a tool. However, in the case of coating work such as greasing, the assembly work can be performed in a similar manner by using a tool such as a dispenser.

As described above, the central portion between the pair of robot arms 2 and 3 is an area suitable for the cooperative operation. However, the pair of robot arms 2 and 3 are diago-nally disposed on the plane 8 of the table 1, so that the long distance L can be obtained at the central portion. Accordingly, the assembly work can be performed from any direction, resulting in improvement of the workability. Furthermore, the cooperatively operable area D for the pair of robot arms 2 and 3 in the space above the plane 8 of the table 1 can be increased while preventing an increase in size of the apparatus. The four sides of the table 1 can be used as an operation area for the two robot arms 2 and 3, so that each side of the table can be freely used, resulting in an increase in the degree of freedom of the robot cell apparatus.

Figure 4:
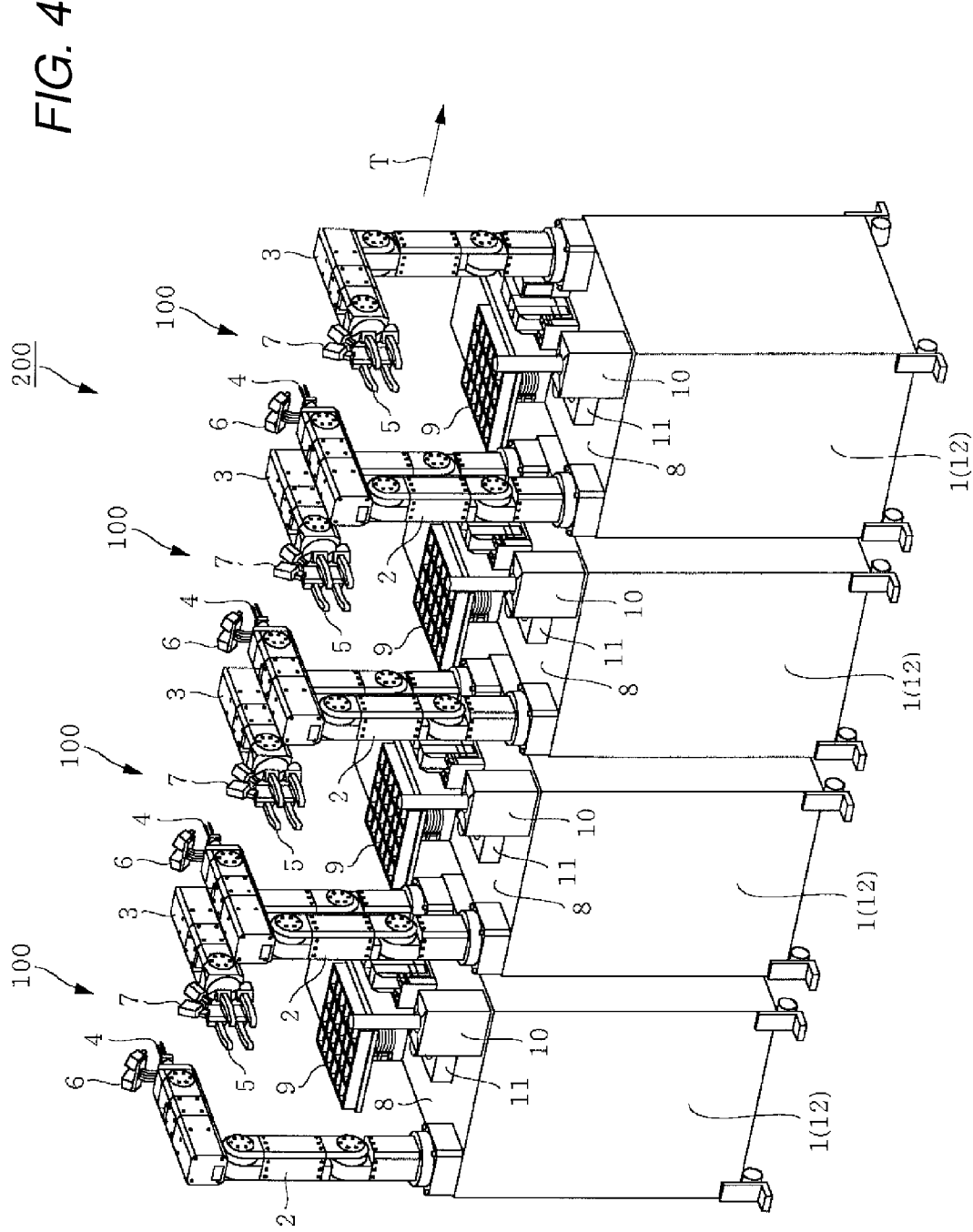
FIG. 4 is a perspective view of a production system including a plurality of robot cell apparatuses according to an embodiment of the present invention.

A production system 200 including a plurality of robot cell apparatuses 100 will be described. FIG. 4 is a perspective view of the production system 200 including the plurality of robot cell apparatuses 100 according to an embodiment of the present invention. FIG. 4 illustrates a case where the production system 200 includes four robot cell apparatuses 100. However, the number of robot cell apparatuses is not limited to this, as long as two or more robot cell apparatuses 100 are provided. The robot cell apparatuses 100 are linearly disposed side by side in a workpiece conveying direction T so that the straight lines connecting the pair of robot arms 2 and 3, which are diagonally disposed on the table 1, are parallel to each other. The tables 1, 1 of two adjacent robot cell apparatuses 100, 100 are disposed to be adjacent to each other so that the robot arm 3 fixed to one of the tables 1 can sequentially convey workpieces to the plane 8 of the other table 1.

Figure 5:
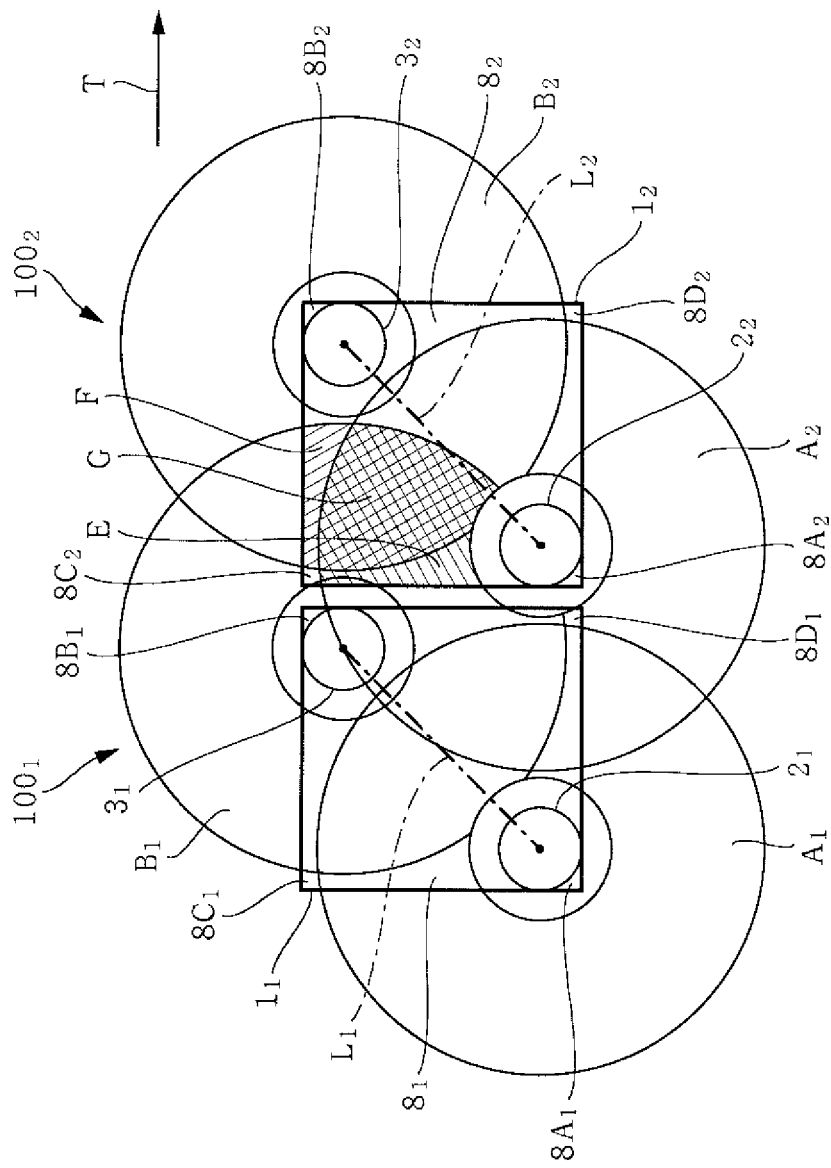
FIG. 5 is an explanatory diagram illustrating movable ranges of robot arms of two adjacent robot cell apparatuses among the plurality of robot cell apparatuses.

FIG. 5 is explanatory diagram illustrating movable ranges of the robot arms of the adjacent two robot cell apparatuses among the plurality of robot cell apparatuses. As the two robot cell apparatuses 100, FIG. 5 illustrates a robot cell apparatus $100_1$ disposed upstream in the conveying direction T and a robot cell apparatus $100_2$ disposed downstream in the conveying direction T.

The proximal ends of robot arms $2_1$ and $3_1$ are turnably fixed to two corners $8A_1$ and $8B_1$, respectively, which are located at diagonal positions among four corners $8A_1$, $8B_1$, $8C_1$, and $8D_1$ of a plane $8_1$ of a table $1_1$. Similarly, the proximal ends of robot arms $2_2$ and $3_2$ are turnably fixed to two corners $8A_2$ and $8B_2$, respectively, which are located at diagonal positions among four corners $8A_2$, $8B_2$, $8C_2$, and $8D_2$ of a plane $8_2$ of a table $1_2$.

The robot arms $2_1$, $3_1$, $2_2$, and $3_2$ are turnable through 360 degrees, so each of operable areas $A_1$, $B_1$, $A_2$, and $B_2$ has a ring shape in plan view. The straight line connecting the pair of robot arms $2_1$ and $3_1$, which are diagonally disposed on the table $1_1$, is indicated by an alternate long and short dash line $L_1$ in FIG. 5. The straight line connecting the pair of robot arms $2_2$ and $3_2$, which are diagonally disposed on the table $1_2$, is indicated by an alternate long and short dash line $L_2$ in FIG. 5. The tables $1_1$ and $1_2$ are disposed in the vicinity of each other so that the alternate long and short dash lines $L_1$ and $L_2$ are parallel to each other. Thus, the robot arms $2_1$, $3_1$, $2_2$, and $3_2$ are disposed in a staggered manner in plan view. Accordingly, the distance between the robot arm $3_1$, which is fixed to one table $1_1$ and is in the vicinity of the other table $1_2$, and the pair of robot arms $2_2$ and $3_2$, which are fixed to the other table $1_2$, is substantially equal to the length of one side of the table. Similarly, the distance between the robot arm $2_2$, which is fixed to the other table $1_2$ and is in the vicinity of one table $1_1$, and the pair of robot arms $2_1$ and $3_1$, which are fixed to one table $1_1$, is substantially equal to the length of one side of the table. In the case of conveying a workpiece in the conveying direction T, the hand provided at the distal end of the robot arm $3_1$ fixed to one table $1_1$ grasps the workpiece, and the proximal end of the robot arm $3_1$ turns, thereby conveying the workpiece to the plane $8_2$ of the other table $1_2$. The workpiece is conveyed to the plane $8_1$ of the table $1_1$ by the robot arm and the hand of the robot cell apparatus in the preceding process. When the assembly work is finished, the workpiece is conveyed by the robot arm $3_1$ and the hand to the plane $8_2$ of the table $1_2$ of the robot cell apparatus $100_2$ in the subsequent process. Alternatively, the workpiece placed on the plane $8_1$ of one table $1_1$ is grasped by the hand provided to the robot arm $2_2$ fixed to one table $1_2$, and the proximal end of the robot arm $2_2$ turns, thereby conveying the workpiece to the plane $8_2$ of the other table $1_2$. Thus, the plurality of robot cell apparatuses 100 are disposed side by side in the conveying direction, thereby allowing the robot arms 2 and 3 of the robot cell apparatuses 100 to sequentially convey workpieces in the conveying direction T. In the case of conveying workpieces, the robot arm $3_1$ or $2_2$ which turns is spaced apart from the other robot arm by about the length of one side of the table. As a result, the area in which the robot arms may interfere with each other is reduced, thereby easily avoiding collision of the robot arms. The workpiece conveying method is not limited these, and the workpiece may be conveyed so that the workpiece is passed to the robot arm $2_2$ from the robot arm $3_1$. Thus, the workpiece can be directly conveyed by the robot arms 2 and 3, thereby eliminating the need for a conveyer or the like and avoiding an increase in size of the overall apparatus (production system).

An area E illustrated in FIG. 5 is an area in which the operable area $B_1$ of the robot arm $3_1$ of the robot cell apparatus $100_1$ and the operable area $A_2$ of the robot arm $2_2$ of the robot cell apparatus $100_2$ in the subsequent process overlap each other in the space above the plane $8_2$ of the table $1_2$. That is, the area E is an area in which the robot arm $3_1$ may interfere with the robot arm $2_2$.

An area F is an area in which the operable area $B_1$ of the robot arm $3_1$ of the robot cell apparatus $100_1$ and the operable area $B_2$ of the robot arm $3_2$ of the robot cell apparatus $100_2$ in the subsequent process overlap each other in the space above the plane $8_2$ of the table $1_2$. That is, the area F is an area in which the robot arms $3_1$ and $3_2$ may interfere with each other.

An area G is an area in which the operable area $B_1$ of the robot arm $3_1$ of the robot cell apparatus $100_1$ and the shared operable area for the robot arms $2_2$ and $3_2$ of the robot cell apparatus $100_2$ in the subsequent process overlap each other in the space above the plane $8_2$ of the table $1_2$. That is, the area G is an area in which the robot arm $3_1$ and the pair of robot arms $2_2$ and $3_2$ may interfere with each other.

As illustrated in FIG. 5, even when the workpiece is conveyed by the robot arm $3_1$ to the robot cell apparatus $100_2$ in the subsequent process and the robot arm $3_1$ enters the space above the table $1_2$ of the robot cell apparatus $100_2$ in the subsequent process, the interference areas E and F are narrowed as compared with the layouts illustrated in FIGS. 3A and 3B. In particular, the area G which overlaps the shared operable area for the robot arms $2_2$ and $3_2$ is narrowed. Accordingly, when the robot arm $3_1$ of the robot cell apparatus $100_1$ enters the space above the table $1_2$ of the adjacent robot cell apparatus $100_2$, a stop time for stopping the robot cell apparatus $100_2$ to avoid collision of the robot arms can be reduced.

As illustrated in FIG. 4, one of two corners other than the two corners to which the pair of robot arms 2 and 3 of the plane 8 of the table 1 of each robot cell apparatus 100 are fixed is the workpiece supply possible area in which the parts supplier 9 is fixed. Workpieces are supplied to the workpiece supply possible area. The other corner is the maintenance possible area in which the tool stand 10 on which a tool is disposed is fixed. Since a tool is placed on the tool stand 10, the tool is disposed in the maintenance possible area. Tools generally require maintenance.

Specifically, in FIG. 5, one corner $8C_1$ of the two corners $8C_1$ and $8D_1$ other than the two corners $8A_1$ and $8B_1$ to which the pair of robot arms $2_1$ and $3_1$ are fixed, respectively, is the workpiece supply possible area, and the other corner $8D_1$ is the maintenance possible area. Similarly, one corner $8C_2$ of the two corners $8C_2$ and $8D_2$ other than the two corners $8A_2$ and $8B_2$ to which the pair of robot arms $2_2$ and $3_2$ are fixed, respectively, is a workpiece supply possible area, and the other corner $8D_2$ is a maintenance possible area.

As illustrated in FIG. 4, the plurality of robot cell apparatuses 100 are aligned in one direction so that the workpiece supply possible areas of the tables 1 are aligned in one direction and the maintenance possible areas of the tables 1 are aligned in one direction. The parts suppliers 9 are aligned in one direction on the side where the robot arm 2 is disposed, and the tool stands 10 are aligned in one direction on the side where the robot arm 3 is disposed. This facilitates supply of parts to each of the parts suppliers 9, and enables operation from one direction at the time of maintaining the tool disposed in each of the maintenance possible areas.

As described above, the plurality of robot cell apparatuses 100 are aligned and the lines connecting the two robot arms 2 and 3 of each of the robot cell apparatuses 100 are set to be parallel to each other, thereby narrowing the operation area in which the robot arms of the adjacent robot cell apparatuses 100 overlap each other. Accordingly, the time for stopping the apparatus to avoid the robot arms from interfering with each other can be reduced, and the deterioration of the productivity can be prevented. Further, workpieces can be directly conveyed by the robot arms, thereby avoiding an increase in size of the overall apparatus. Furthermore, the workpiece supply possible areas and the maintenance possible areas are aligned, thereby facilitating supply of parts. Moreover, only the operation from one direction is required during maintenance, thereby improving the productivity.

Although the present invention has been described based on the above embodiments, the present invention is not limited thereto. The above embodiments have exemplified the case where the plurality of robot cell apparatuses is linearly disposed. However, even if the robot cell apparatuses are disposed in a zigzag manner, the same effects can be obtained as long as the lines connecting the robot arms of the robot cell apparatuses are parallel to each other. As a matter of course, a slight deviation may be caused depending on the accuracy of the robot arm mounting position with respect to the table and the accuracy of the fixed positions of the robot cell apparatuses. Therefore, the absolute accuracy of "parallelism" described above can be arbitrarily determined by a user.

INDUSTRIAL APPLICABILITY

The present invention is suitably applicable to a robot cell apparatus for use in precise assembly work and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-115326, filed May 19, 2010, which is hereby incorporated by reference herein in its entirety.

REFERENCE SIGNS LIST

1 TABLE
2, 3 ROBOT ARM
2a, 3a PROXIMAL END
2b, 3b DISTAL END
4, 5 HAND
8 PLANE
100 ROBOT CELL APPARATUS
200 PRODUCTION SYSTEM
D COOPERATIVELY OPERABLE AREA

The invention claimed is:

1. A robot cell apparatus comprising:
a pair of articulated robot arms each having a distal end at which a hand capable of grasping a workpiece is provided, a wrist portion allowing the hand to rock, a turnable proximal end, a minimum turnable range, and a moveable area of the wrist portion;
a table with a plane having a quadrangular shape in plan view, the proximal ends of the robot arms being respectively fixed to two corners of the table at diagonal positions among the four corners of the plane of the table, a distance between the pair of robot arms being set so that (1) the moveable area of the wrist portion of one articulated robot arm and the movable area of the wrist portion of the other articulated robot arm overlap each other, the overlapping movable area forming a cooperatively operable area in a space above the plane of the table, and (2) the minimum turnable ranges of the pair of articulated robot arms do not overlap the cooperatively operable area; and
a control device causing the pair of articulated robot arms to cooperatively perform an assembly operation in the cooperatively operable area.

2. A production system comprising:
a plurality of robot cell apparatuses, each robot cell apparatus including:
a pair of articulated robot arms each having a distal end at which a hand capable of grasping a workpiece is provided, a wrist portion allowing the hand to rock, a turnable proximal end, and a moveable area of the wrist portion;
a table with a plane having a quadrangular shape in plan view, the proximal ends of the robot arms being respectively fixed to two corners of the table at diagonal positions among the four corners of the plane of the table, a distance between the pair of robot arms being set so that the moveable area of the wrist portion of one articulated robot arm and the movable area of the wrist portion of the other articulated robot arm overlap each other, the overlapping movable area forming a cooperatively operable area in a space above the plane of the table;
a control device causing the pair of articulated robot arms to cooperatively perform an assembly operation in the cooperatively operable area;
a parts supplier disposed at one of two corners of the plane of the table other than the two corners to which the pair of robot arms are fixed; and
a tool stand disposed at the other corner of the plane of the table other than the two corners to which the pair of robot arms are fixed and the corner to which the parts supplier is disposed,
wherein the plurality of robot cell apparatuses are disposed side by side in a workpiece conveying direction so that straight lines connecting the pair of robot arms of the robot cell apparatuses are parallel to each other, the plurality of robot cell apparatuses are disposed side by side so that the areas in which the parts supplier is disposed are aligned and the areas in which the tool stand is disposed are aligned, and the production system is structured so that workpieces are capable of being sequentially conveyed by the robot arms of the robot cell apparatuses.

* * * * *